United States Patent
Hansen-Quartey

(10) Patent No.: US 12,492,519 B2
(45) Date of Patent: Dec. 9, 2025

(54) PORTABLE DEVICE FOR COLLECTING AND DISPOSING PET WASTE

(71) Applicant: James Alfred Hansen-Quartey, West Haven, CT (US)

(72) Inventor: James Alfred Hansen-Quartey, West Haven, CT (US)

( * ) Notice: Subject to any disclaimer, the term of this patent is extended or adjusted under 35 U.S.C. 154(b) by 0 days.

(21) Appl. No.: 19/062,400

(22) Filed: Feb. 25, 2025

(65) Prior Publication Data

US 2025/0333918 A1    Oct. 30, 2025

Related U.S. Application Data

(60) Provisional application No. 63/639,168, filed on Apr. 26, 2024.

(51) Int. Cl.
*E01H 1/12*     (2006.01)

(52) U.S. Cl.
CPC .................. *E01H 1/1206* (2013.01)

(58) Field of Classification Search
CPC ................................................ E01H 1/1206
See application file for complete search history.

(56) References Cited

U.S. PATENT DOCUMENTS

| | | | | |
|---|---|---|---|---|
| 8,292,339 B1 * | 10/2012 | Auseklis | ............... | E01H 1/1206 |
| | | | | 294/1.4 |
| 8,876,180 B2 * | 11/2014 | Kirby | ................... | E01H 1/1206 |
| | | | | 294/1.3 |
| 10,851,506 B1 * | 12/2020 | Sabella | ................. | E01H 1/1206 |
| 11,008,718 B2 * | 5/2021 | Cacho | ................... | E01H 1/1206 |
| 11,118,320 B2 * | 9/2021 | Patterson | ............ | H05B 3/0014 |
| 11,261,572 B1 * | 3/2022 | Knight | ................. | E01H 1/1206 |

\* cited by examiner

*Primary Examiner* — Stephen A Vu

(57) ABSTRACT

A portable device for collecting and disposing of pet waste is configured with a housing that holds a scooper assembly connected to a handle and trigger. The handle is at least indirectly connected to the scooper assembly such that vertical manipulation of the handle translates to corresponding vertical manipulation of the scooper assembly. The handle is connected to an extender rod that connects to the scooper assembly and causes the scooper to extend out a downstream capture opening. The handle includes a trigger that the user can pull, which causes a scooper within the scooper assembly to open so the device can capture the pet waste responsive to user manipulation. A discharge chute on the housing is aligned with the scooper when the scooper is retracted, so that the user can then open the scooper and allow the waste to exit through the chute.

16 Claims, 7 Drawing Sheets

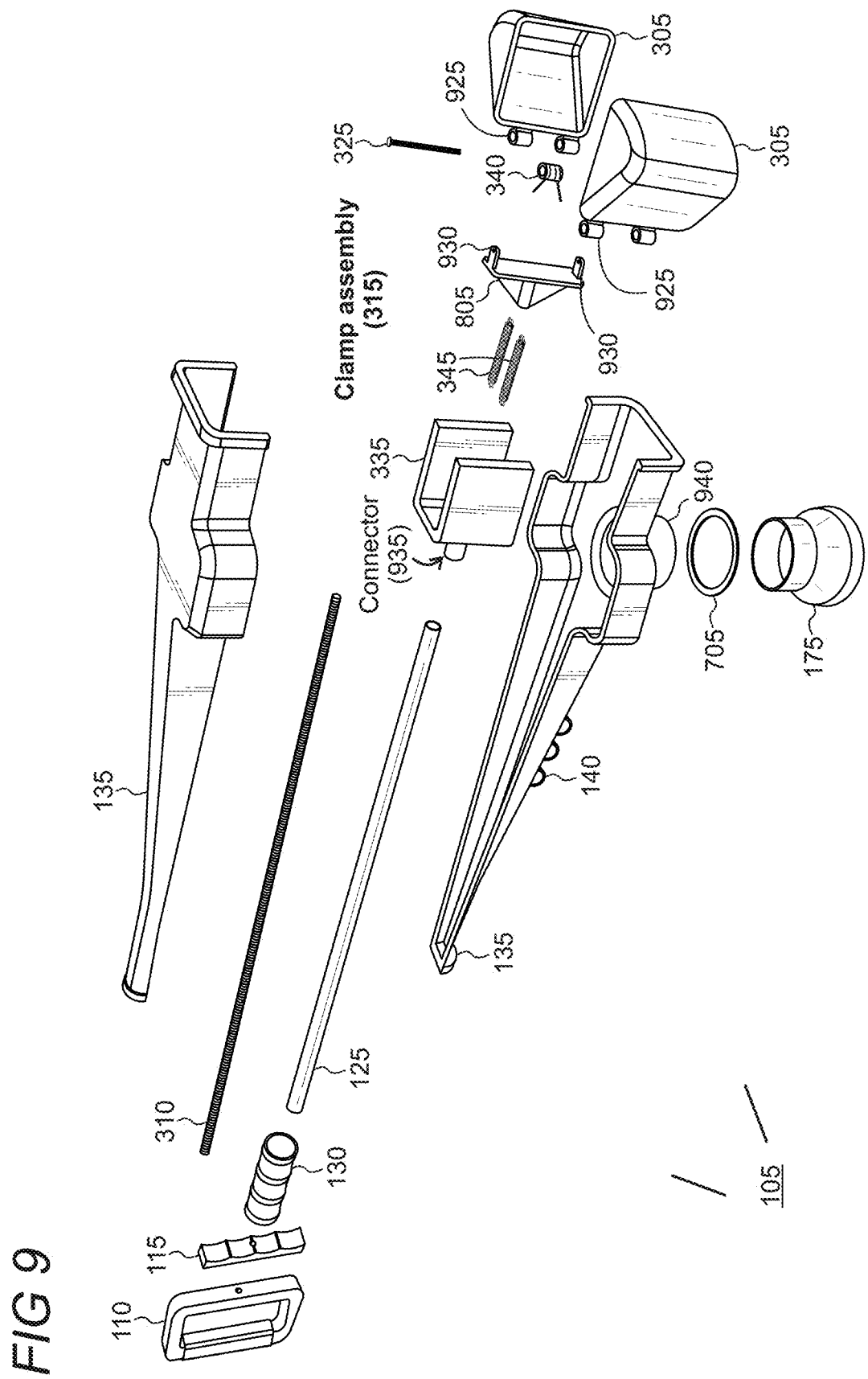

PORTABLE DEVICE FOR COLLECTING AND DISPOSING PET WASTE

CROSS-REFERENCES TO RELATED APPLICATIONS

This Non-Provisional Patent application claims the benefit of and priority to U.S. Provisional Patent Application Ser. No. 63/639,168, filed Apr. 26, 2024, entitled "Hands-free Pet Waste Collection and Disposal Device," the entire contents of which are hereby incorporated herein by reference.

BACKGROUND

Pet owners must constantly deal with their pets' bathroom waste, namely, bowel movements. Cleaning up after a pet owner's dog is challenging, and some owners don't even clean up after their dog, at least not consistently, because current waste collection products are clumsy or inadequate.

SUMMARY

A portable device for collecting and disposing of pet waste is configured with a housing with a scooper assembly connected to a handle and trigger. The handle is at least indirectly connected to the scooper assembly such that vertical manipulation of the handle translates to corresponding vertical manipulation of the scooper assembly. The handle is connected to an extender rod that connects to the scooper assembly and causes the scooper to extend out a capture opening positioned downstream and aligned with the scooper assembly and extender rod. The handle includes a trigger that the user can pull, which causes a scooper within the scooper assembly to open so the device can capture the pet waste responsive to user manipulation. The trigger is connected to a trigger rod that is connected to a scoop closer. The scoop closer includes two arms that engage with the outside of each scooper half, thereby forcing the scooper halves shut. The scooper halves include receptacles that are arranged around a hinge pin. The hinge pin includes a hinge spring that is oriented to constantly force the scooper halves open, but the halves stay shut because of the constant pressure from the scoop closer that is constantly engaging with the scooper halves in a downward position opposite the hinge spring's pressure. Thus, once the trigger is pulled and the scoop closer is translatingly pulled upward, the hinge spring's outward pressure against the scooper halves forces them open until the trigger is released and the scoop closer is back in an original position.

Once the scooper halves open and the waste is collected, the scooper assembly and extender rod revert to a retracted position. The retracted position may occur when a user pulls up on the handle, or the assembly may be spring-loaded such that the extender rod, trigger rod, and scooper assembly return to a retracted position. Once the waste is collected, the scoopers are closed and hold the waste, and the scooper returns to the housing; the scooper is aligned with a discharge chute. The discharge chute is positioned on an off-linear position of the extender rod and the capture opening. When the user pulls the trigger and causes the scooper to open, the waste drops down through the discharge chute and into a waste bag attached to the discharge chute. The waste bag may be attached to the discharge chute via, for example, a retention ring that tightens around the discharge chute's periphery. The housing stores a disinfectant spray that the user can easily retrieve to spray down the scooper's interior after the waste is discharged.

BRIEF DESCRIPTION OF THE DRAWINGS

FIG. 9 shows an illustrative exploded representation of the device.

Like reference numerals indicate like elements in the drawings. Elements are not drawn to scale unless otherwise indicated.

DETAILED DESCRIPTION

Figure 1:
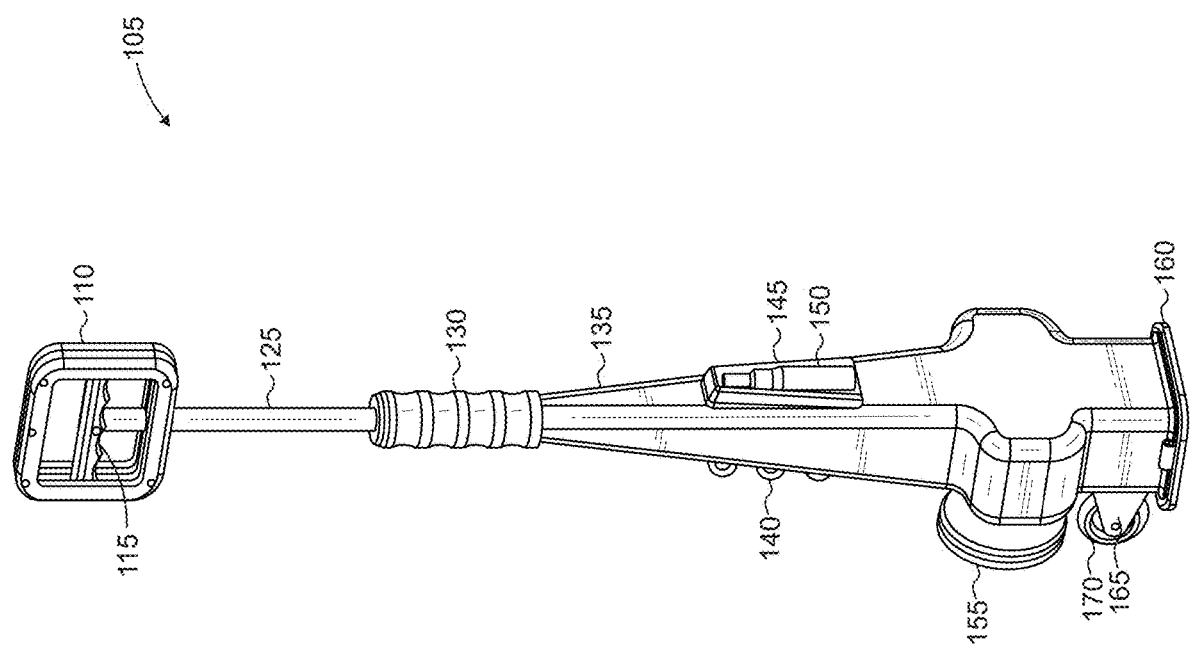
FIG. 1 shows an illustrative representation of a portable device for collecting pet waste.
Figure 2:
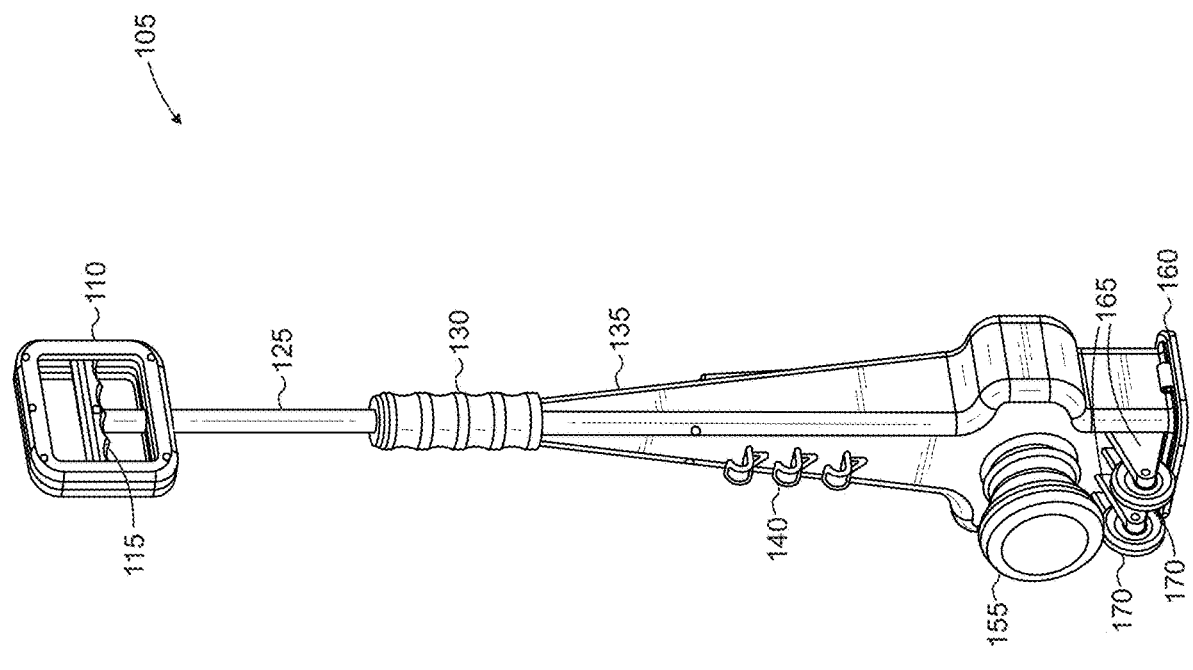
FIG. 2 shows an illustrative representation of the device from the opposite side of FIG. 1.

FIGS. 1 and 2 show illustrative representations of a portable device 105 for collecting and disposing of pet waste. The device includes a handle 110 that the user can hold, along with a grip 130 downstream from the handle the provides additional grip for the user. The device includes an extender rod 125 extending from at least the handle 110 and into the housing 135. While the extender rod 125 could end at the bottom of the handle 110, the extender rod extends to the trigger 115 so that a trigger rod (not shown in FIG. 1) is controllable by the trigger 115.

The housing 135 includes a series of hooks 140 to hold items, such as unused or used waste bags that the user hangs after using the device 105. On the opposite side of the hooks is a cubby 145 holding a spray bottle 150. The cubby and bottle may be configured in a press-fit manner such that the bottle securely press-fits into the cubby. The bottle may be, for example, a disinfectant spray bottle that the user can spray on the device 105 after use, such as on the device's scooper (not shown in FIG. 1).

The portable device 105 includes a discharge chute 155, which leads inside the housing 135 so that pet waste, after being collected, can be released through the discharge chute and into a bag (not shown) or garbage pail. The discharge chute may be positioned off-linear from the extender rod's and trigger rod's orientation, such that the discharge chute is akin to a perpendicular location to the extender rod. A capture opening 160 is present so that a scooper, controllable via the extender rod 125, extends downward out of the capture opening and then upward back into the housing 135 when the extender rod is pulled upward. The device 105 includes a mounting bracket 165 attached to the housing 135, such as via screws or bolts, that are attached to wheels 170 so the user can roll the device, if necessary, for easier handling and portability.

Figure 3:
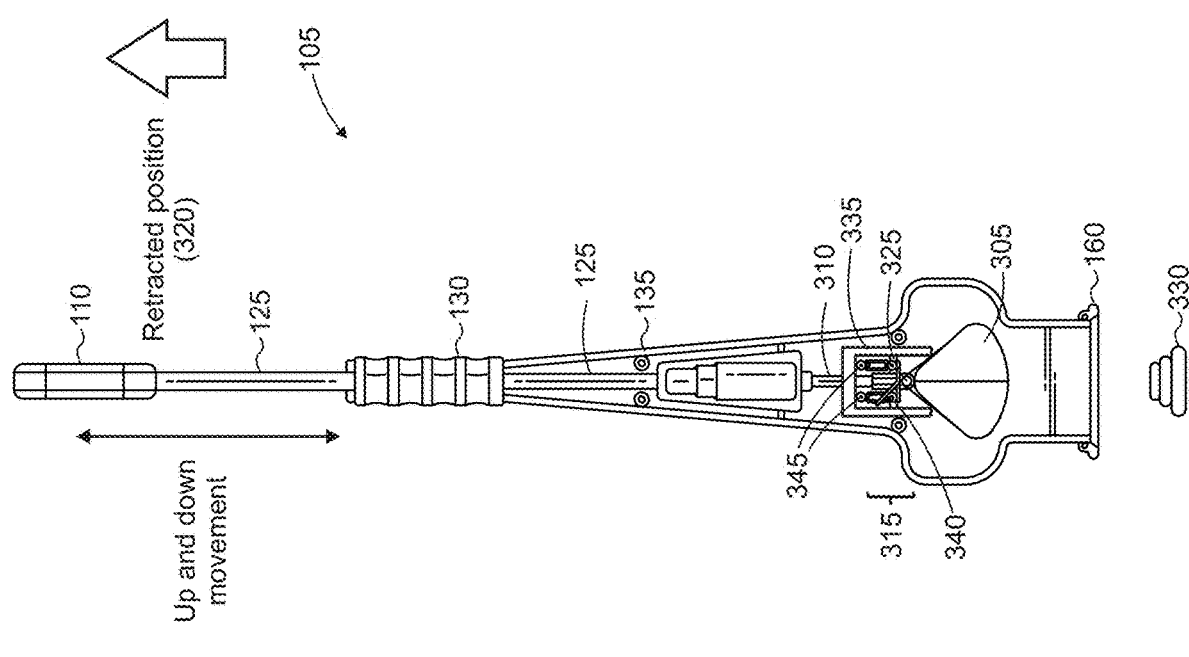
FIG. 3 shows an illustrative cross-sectional representation of the device with an extender rod in a retracted position.

FIG. 3 shows an illustrative and partial cross-sectional representation of the portable device 105 in a retracted position 320. The retracted position signifies that the extender rod 125, handle 110, and scooper assembly 315 are in a retracted, or closed, position, such that the scooper assembly is positioned inside the housing 135. The extender rod 125 extends into the housing 135 toward the scooper 305. The scooper 305 is comprised of two scooping halves that are separate and open and responsive to a user pulling on the trigger 115 (FIGS. 1 and 2). Specifically, the extender rod 125 is attached to the trigger rod 310 which in turn connects to a scooper assembly 315 that is comprised of various components to enable control and manipulation of the scooper, as explained in further detail below. Thus, when the user pushes down on or pulls up on the handle 110, and thereby the extender rod 125, the extender rod's movement translates to the trigger rod 310, which then pushes down on the scooper assembly and pushes the scooper downward through the capture opening 160. In some implementations, a spring may be connected to the extender rod to cause the extender rod and the scooper assembly to return to a retracted (up) position.

Typically, the trigger 115 and scoop assembly 315 may be configured such that pulling the trigger causes the trigger rod to pull up on a scoop closer 335 which acts as a force to keep the scooper halves 305 closed. The scooper halves 305 are connected via a hinge pin 325 and hinge spring 340. The hinge pin pushes the scooper halves in a constant open position, but the scoop closer 335 pushes down on the top of the scooper halves to keep them in a closed position. Thus, when the user pulls on the trigger, which causes the trigger rod 310 to pull up on the scoop closer 335, the scooper halves are no longer pressured downward in a closed position, and the hinge spring 340 propels them up temporarily. The pivot mechanism is the hinge pin 325 that goes through both scoopers 305 and acts as the fulcrum, letting each scooper rotate and open.

Figure 4:
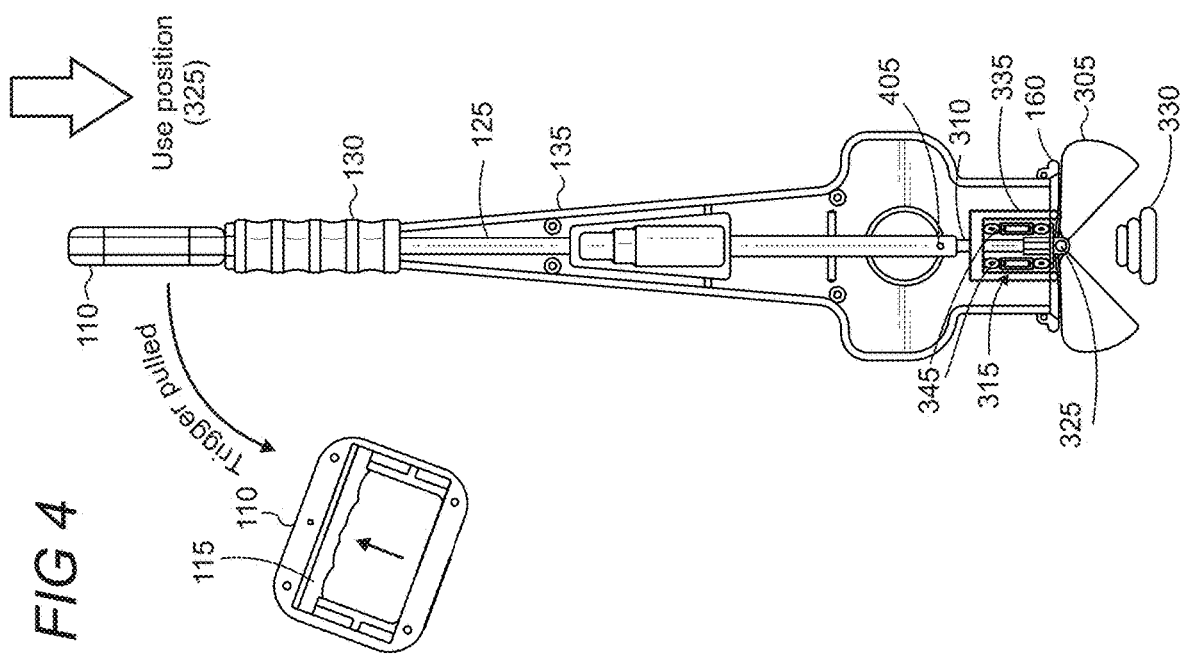
FIG. 4 shows an illustrative representation of the extender rod in a use position, causing the scooper to extend outside the housing and the trigger in a pulled position.

FIG. 4 shows an illustrative and partial cross-sectional representation of the portable device's scoopers 305, pushed downward into a use position 325. When the scoopers reach outside the capture opening 160, the user can pull the trigger 115 on the handle 110 to pull up the scoop closer 335. This enables the hinge spring to prop open the scoopers 305 and capture the waste 325.

Figure 5:
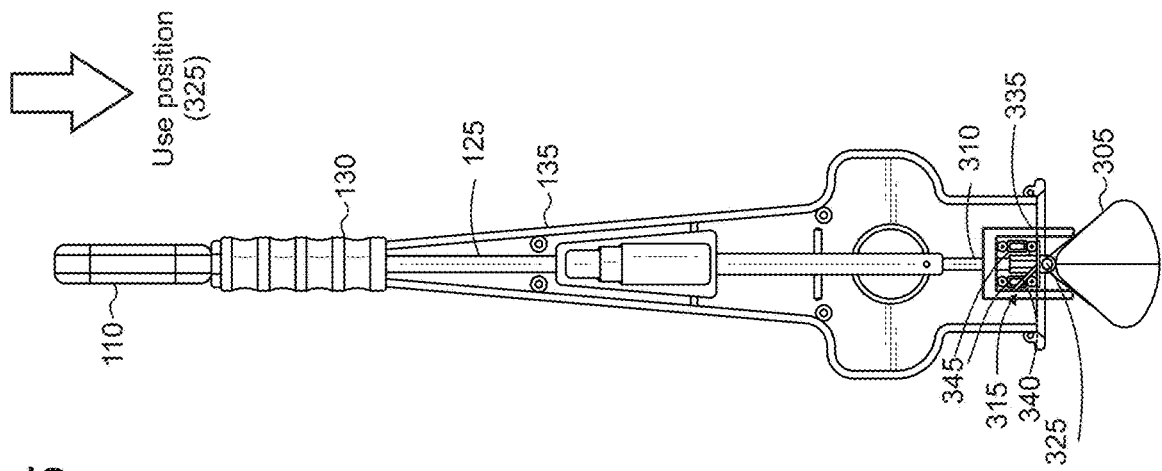
FIG. 5 shows an illustrative representation of the extender rod still in a use position and the trigger being released to shut the scooper.

FIG. 5 shows an illustrative representation in which the user, after capturing the pet waste 325, releases the trigger 115, which causes the springs 340 to revert to their original (unstretched) position. This pushes the scoop closer 335 back into its original position against the scoop halves 305 for closure. The extender rod 125 is still in a use position 325, so the scooper is positioned outside of the housing 325, which may occur because of continued user downward pressure on the handle 110.

Figure 6:
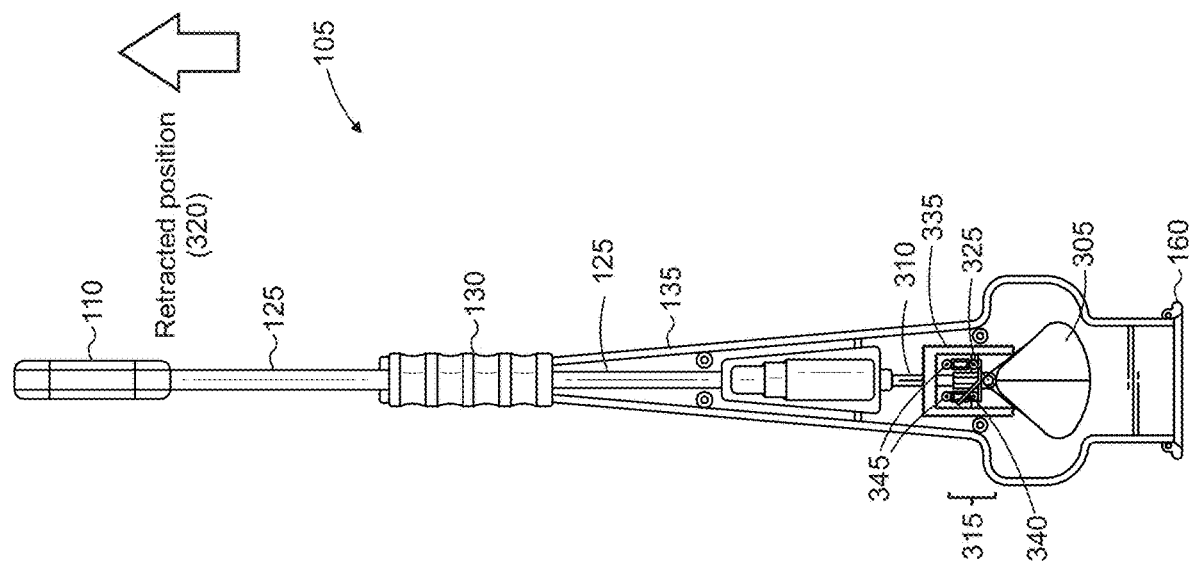
FIG. 6 shows an illustrative representation of the extender rod in the retracted position.

FIG. 6 shows an illustrative representation where the user released or pulled the handle 110 upward to put the handle, extender rod 125, and scooper assembly 315 back into the retracted position 320. In this regard, the user may pull the handle upward, or if a spring is implemented and connected to the extender rod, the user may simply let go of the handle such that the handle springs back into the retracted position. The spring may be, for example, connected to the housing 135 and extender rod 125 so that it stretches when the user pushes down on the handle 110. Then, the spring reverts to its rest or original position once the user releases the handle. Once the scooper assembly 315 retracts into housing 135, the scoopers 305 can release the waste through the discharge chute 155.

Figure 7:
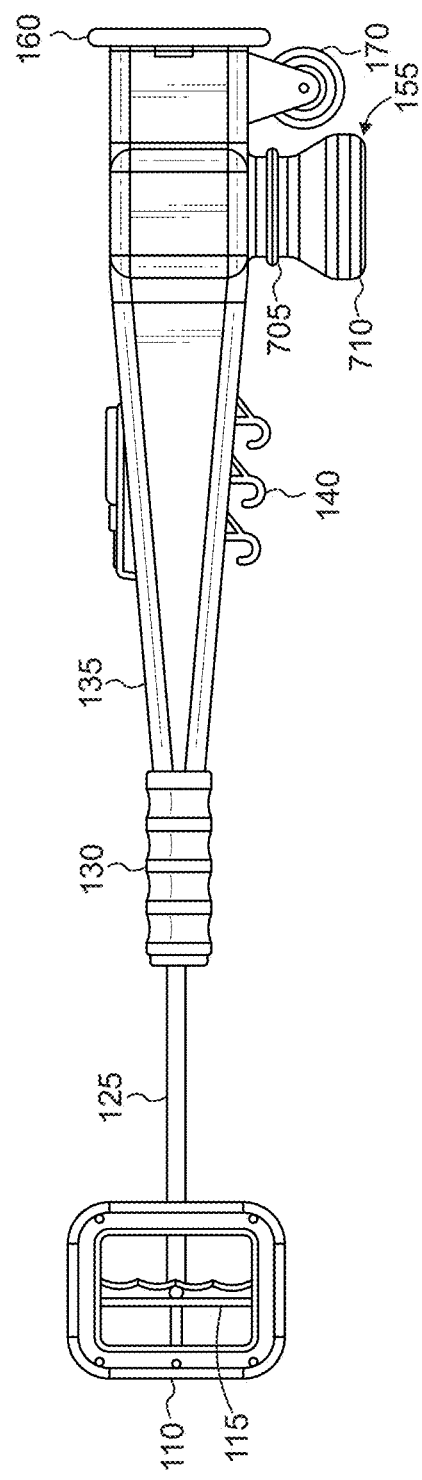
FIG. 7 shows an illustrative representation of the device in a retracted position, and the device is holding the pet waste gathered from FIGS. 4-6.
Figure 8:
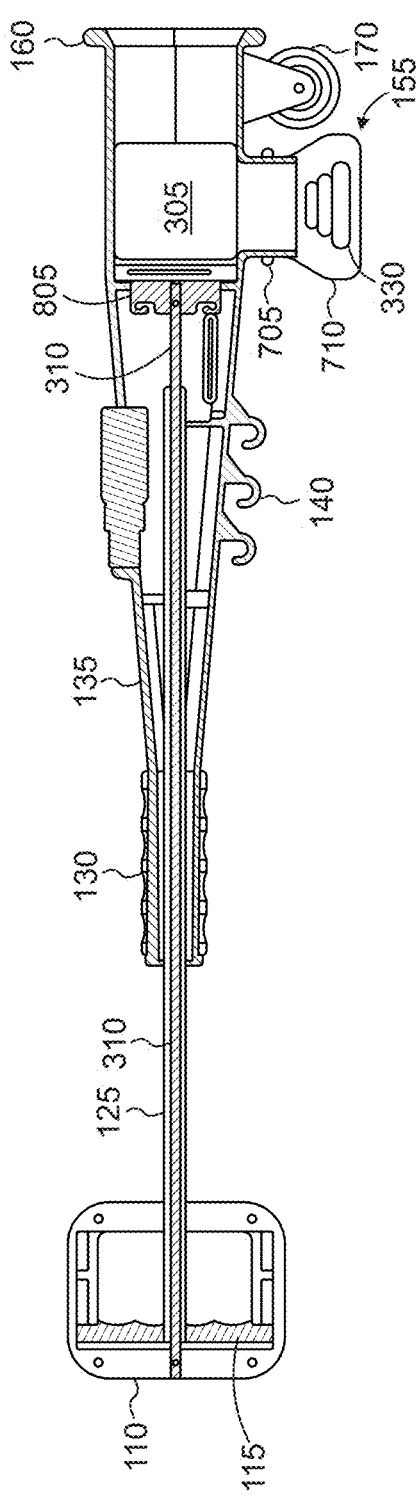
FIG. 8 shows an illustrative cross-sectional representation of the device with the trigger contracted and the scooper opens to drop the collected waste into a waste bag.

FIGS. 7 and 8 show illustrative representations in which the trigger 115 is in a released position so that the scooper 305 is closed and holding the waste 325. FIG. 8 shows the cross-sectional view and the scooper 305 aligned with the discharge chute 155 when the extender rod 125 is in the retracted position. Thus, once the user captures the waste (FIGS. 4-6), the user can pull the trigger 115 to open the scooper 305, releasing the captured waste into a bag 710 connected to the discharge chute 155. Opening and closing the scoop halves 305 is similar to that described above, only the scooper is now entirely within the housing 325 so that the waste 330 can be easily dropped out the dedicated discharge chute 155. FIG. 8 also shows the scooper mount 805, which is the mounting bracket for the scooper halves 305 and hinge pin 325, about which the scooper halves rotate or pivot.

The bag 710 may be attached to the discharge chute 155 via, for example, a retention ring 705 that extends around the discharge chute and holds the bag in place. The retention ring may be made of an elastic material, such as rubber or silicone, for easier removal and lifting around the discharge chute. Other fastening or retention mechanisms may be possible, such as the chute having a flange and indent that the user can tuck the bag into or another retention mechanism. Thus, once the user pulls on the trigger 115, the scooper 305 opens, which causes the scooper halves to open via the fulcrum to which the trigger rod is connected.

FIG. 9 shows an illustrative exploded representation of the portable device 105. The trigger rod 310, in this situation, is a spring-like structure, but in other implementations, it may be a cable or rod connected to the clamp assembly 315. The trigger rod is inserted and positioned inside an opening or cavity of the extender rod 125. Thus, the trigger rod may be open on both ends or at least the end proximate to the clamp assembly so that the trigger rod 310 can exit therefrom. The grip 130 may also include an opening on both ends so the extender rod can extend through its body and into the housing 135. The housing may be formed of two parts, a top and bottom piece, that attach together, such as via bolts, screws, press-fit, male-female connection, molded together, etc.

The clamp assembly 315 includes the scoop closer 335 through which the trigger rod 310 attaches to the connector 935, which enables retraction of the trigger 115 and trigger rod 310 to pull the scoop closer upward and disengage from the scooper halves 305. The hinge pin connects through the scooper halves' respective receptacles 925 and between the ends 930 of the scoop mount 805. Thus, once the user pulls on the trigger 115, this action pulls the scoop closer upward off the scoop halves, allowing the hinge spring 340 to prop open the scoop halves 305.

The discharge chute 175 is connected to an opening 940 in the housing 135. The discharge chute may be press-fitted against a wall of the opening, such that it may be removable, if necessary, such as to clean the discharge chute occasionally. The retention ring 705 is positioned around the discharge chute to hold a bag in place.

The housing 325, trigger 115, handle 110, scooper 305, and discharge chute 155 may be made of metal, plastic, or another suitable polymer that can serve the functions herein. Other components, such as the trigger rod 310, extender rod 125, and scooper assembly 315, may be made of metal, but plastic and other suitable materials may also be possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A portable device for picking up waste, comprising:
   a handle having a trigger, the trigger connected to a trigger rod that at least indirectly connects and controls a scooper;
   a housing downstream from the handle and within which the trigger rod is at least partially present, wherein the scooper has a retracted position in which the scooper is stored within the housing and a use position in which the scooper extends outside of the housing through a capture opening, wherein the scooper extends out of the capture opening in a linear direction relative to the trigger rod;
   an extender rod that at least indirectly extends from the handle and is adapted to move in a vertical motion to control the scooper between the retracted position and the use position; and
   a discharge chute positioned in an off-linear location from the trigger rod, and the discharge chute at least partially aligns with the scooper when the scooper is in the retracted position.

2. The portable device of claim 1, wherein the discharge chute forms a discharge chute that extends beyond a wall of the housing.

3. The pickup device of claim 2, further comprising a retention ring positioned around the discharge chute.

4. The portable device of claim 1, wherein the trigger rod is positioned at least partially inside of the extender rod.

5. The portable device of claim 4, wherein at least a portion of the trigger rod extends outward from a distal end of the extender rod.

6. The portable device of claim 5, wherein a distal end of the trigger rod connects to a pivot point that, responsive the trigger being pulled, props the scooper open.

7. The portable device of claim 6, further comprising a spring that causes the scooper to close when the trigger is released.

8. The portable device of claim 7, wherein the distal end of the trigger rod connects to a scooper mount connected to the scooper.

9. A method of implementing a portable device for picking up waste, comprising:
   providing a handle having a trigger, the trigger connected to a trigger rod that at least indirectly connects and controls a scooper;
   providing a housing downstream from the handle and within which the trigger rod is at least partially present, wherein the scooper has a retracted position in which the scooper is stored within the housing and a use position in which the scooper extends outside of the housing through a capture opening, wherein the scooper extends out of the capture opening in a linear direction relative to the trigger rod;
   an extender rod that at least indirectly extends from the handle and is adapted to move in a vertical motion to control the scooper between the retracted position and the use position; and
   attaching a discharge chute to the housing, the discharge chute being positioned in an off-linear location from the trigger rod, and the discharge chute at least partially aligns with the scooper when the scooper is in the retracted position.

10. The portable device of claim 9, wherein the discharge chute forms a discharge chute that extends beyond a wall of the housing.

11. The pickup device of claim 10, further comprising a retention ring positioned around the discharge chute.

12. The portable device of claim 9, wherein the trigger rod is positioned at least partially inside of the extender rod.

13. The portable device of claim 12, wherein at least a portion of the trigger rod extends outward from a distal end of the extender rod.

14. The portable device of claim 13, wherein a distal end of the trigger rod connects to a pivot point that, responsive the trigger being pulled, props the scooper open.

15. The portable device of claim 14, further comprising a spring that causes the scooper to close when the trigger is released.

16. The portable device of claim 15, wherein the distal end of the trigger rod connects to a scooper mount connected to the scooper.

* * * * *